US012290164B1

(12) United States Patent
Zhang

(10) Patent No.: US 12,290,164 B1
(45) Date of Patent: May 6, 2025

(54) ELECTRONIC LIMIT CONTROL METHOD OF ELECTRIC TOOTHBRUSH AND ELECTRIC TOOTHBRUSH

(71) Applicant: GUANGZHOU STARS PULSE CO., LTD., Guangdong (CN)

(72) Inventor: Yuwei Zhang, Guangdong (CN)

(73) Assignee: GUANGZHOU STARS PULSE CO., LTD., Guangzhou (CN)

( * ) Notice: Subject to any disclaimer, the term of this patent is extended or adjusted under 35 U.S.C. 154(b) by 0 days.

(21) Appl. No.: 18/898,906

(22) Filed: Sep. 27, 2024

Related U.S. Application Data

(63) Continuation-in-part of application No. PCT/CN2024/097103, filed on Jun. 3, 2024.

(30) Foreign Application Priority Data

Dec. 29, 2023 (CN) .......................... 202311874354.4

(51) Int. Cl.
| | |
|---|---|
| A46B 15/00 | (2006.01) |
| A46B 13/02 | (2006.01) |
| A61C 17/22 | (2006.01) |
| A61C 17/34 | (2006.01) |

(52) U.S. Cl.
CPC ........ *A46B 15/0012* (2013.01); *A46B 13/023* (2013.01); *A46B 15/0006* (2013.01); *A61C 17/221* (2013.01); *A61C 17/34* (2013.01)

(58) Field of Classification Search
CPC .............. A46B 15/0012; A46B 13/023; A46B 15/0006; A61C 17/221; A61C 17/34
See application file for complete search history.

(56) References Cited

U.S. PATENT DOCUMENTS

2009/0265869 A1* 10/2009 Gonzalez ............... A46B 9/026
15/22.1

FOREIGN PATENT DOCUMENTS

| CN | 203539472 U | 4/2014 |
|---|---|---|
| CN | 109381275 A | 2/2019 |
| CN | 111150515 A | 5/2020 |
| CN | 111588509 A | 8/2020 |
| CN | 111987849 A | 11/2020 |
| CN | 215739596 U | 2/2022 |
| CN | 114557788 A | 5/2022 |

(Continued)

OTHER PUBLICATIONS

CNIPA, First Office Action issued for Chinese Application No. 202311874354.4, mailed May 20, 2024 (7 pages).

(Continued)

*Primary Examiner* — Mi'Schita' Henson
(74) *Attorney, Agent, or Firm* — Daniel M. Cohn

(57) ABSTRACT

An electronic limit control method of an electric toothbrush and the electric toothbrush are provided. The electric toothbrush includes a brush head a motor connected to the brush head. A rotating shaft of the motor is configured to drive the brush head to rotate within a predetermined range. The motor of the electric toothbrush is controlled to continuously output a target holding force when the electric toothbrush is in a first state. When an external force applied to the brush head is unable to overcome the target holding force of the motor on the brush head, the brush head is kept in the target position, so that the electric toothbrush is allowed to be used normally in various situations.

19 Claims, 7 Drawing Sheets

(56) References Cited

FOREIGN PATENT DOCUMENTS

| | | |
|---|---|---|
| CN | 115813590 A | 3/2023 |
| CN | 219835700 U | 10/2023 |
| CN | 117814942 A | 4/2024 |
| JP | 2017205438 A | 11/2017 |

OTHER PUBLICATIONS

Notification to Grant Patent Right for Invention, Chinese Application No. 202311874354.4, mailed Jul. 30, 2024 (3 pages).

* cited by examiner

Controlling a motor of the electric toothbrush to continuously output a target holding force to enable a brush head of the electric toothbrush being kept at a target position, when the electric toothbrush is in a first state ⟵ 202

ELECTRONIC LIMIT CONTROL METHOD OF ELECTRIC TOOTHBRUSH AND ELECTRIC TOOTHBRUSH

TECHNICAL FIELD

The present disclosure relates to a technical field of oral cleaning, and in particular to an electronic limit control method of an electric toothbrush and the electric toothbrush.

BACKGROUND

A motor of an electric toothbrush commonly comprises a mechanical limit structure to prevent a brush head of the electric toothbrush from swinging too much, but it is difficult for such electric toothbrush to simulate a brushing method of vibrating and brushing, make the electric toothbrush difficult to meet needs of different users. In order to solve the problem, in the related art, a motor without any mechanical limit device but an electronic limit mechanism is applied to the electric toothbrush to flexibly adjust a vibration angle of the motor.

However, since the electric toothbrush with the electronic limit structure does not have the mechanical limit device, the electric toothbrush is unable to be used normally in some situations.

SUMMARY

Embodiments of the present disclosure provide an electronic limit control method of an electric toothbrush and the electric toothbrush. When the electric toothbrush is turned on and the motor is not working, there is a holding force on a rotating shaft of the electric toothbrush, so that the electric toothbrush is able to be used normally no matter the motor is working or not.

The embodiments of the present disclosure provide the electronic limit control method of the electric toothbrush. The electric toothbrush comprises a brush head and a motor. The brush head is connected to the motor. A rotating shaft of the motor is able to rotate in a non-powered state under a force, and the rotating shaft of the motor is configured to drive the brush head to rotate within a predetermined range. The electronic limit control method comprises a step of controlling the motor of the electric toothbrush to continuously output a target holding force to enable the brush head of the electric toothbrush being kept at a target position when the electric toothbrush is in a first state. The first state comprises one or more of a wake-up state, a stop state, and a manual state.

The embodiments of the present disclosure provide the electric toothbrush. The electric toothbrush comprises a memory and a processor. A computer program is stored in the memory. The computer program is executed by the processor to implements the electronic limit control method mentioned above.

When an external force applied to the brush head is unable to overcome the target holding force of the motor on the brush head, the brush head remains in the target position, ensuring the normal use of the electric toothbrush and improving reliability of the electric toothbrush.

BRIEF DESCRIPTION OF DRAWINGS

In order to more clearly illustrate technical solutions in embodiments of the present disclosure, drawings in the embodiments are briefly introduced below.

DETAILED DESCRIPTION

The technical solutions in the embodiments of the present disclosure will be clearly and completely described below in conjunction with the drawings in the embodiments of the present disclosure.

It should be noted that terms "comprise", "include", and any variations thereof are intended to cover non-exclusive inclusion, e.g., includes a series of steps or units, processes, methods, systems, products, or devices, which are not limited to the listed steps or units, but may optionally further include steps or units not listed, or optionally further includes steps or units inherent to the processes, methods, products, or devices.

In the related art, a conventional electric toothbrush adopts a motor without a mechanical limit device to increase an adjustment range of a rotating angle of the motor. However, when the motor is not in operation, if the user wants to use the electric toothbrush manually, for example, to manually brush areas that are not cleaned properly, brush a tongue coating, etc., the brush head of the electric toothbrush is prone to rotation. As a result, the user is unable to manually use the electric toothbrush to well clean an oral cavity.

In view of this, embodiments of the present disclosure provide an electronic limit control method and device for an electric toothbrush, and the electric toothbrush, which improve reliability of the electric toothbrush and ensures normal use of the electric toothbrush.

Figures 1, 2:
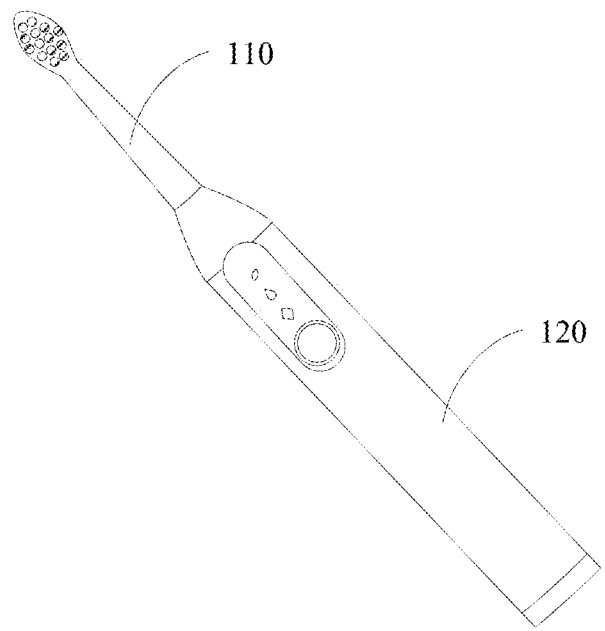
FIG. 1 is a schematic diagram showing an application scenario of an electronic limit control method of an electric toothbrush according to one embodiment of the present disclosure.
FIG. 2 is a flow chart of the electronic limit control method of the electric toothbrush according to one embodiment of the present disclosure.

As shown in FIG. 1, FIG. 1 shows an application scenario of the electronic limit control method according to one embodiment of the present disclosure. The electronic limit control method is applied to the electric toothbrush. The electric toothbrush comprises a brush head 110, a handle 120 and a motor (not shown in FIG. 1). The brush head 110 is detachably connected to the handle 120. The motor is disposed in the handle 120 and is connected to the brush head 110. The motor does not comprise a mechanical limit device. A rotating shaft of the motor is able to rotate when subjected to a force in a non-powered state. The rotating shaft of the motor is configured to drive the brush head 110 to rotate within a predetermined range to clean the oral cavity.

Specifically, the rotating shaft of the motor is rotatable within a predetermined angle range under the force when not powered on. The rotating shaft of the motor is rotatable by 10°, 15°, 20°, 30°, 45°, 60°, 75°, 90°, 120°, 150°, 180°, 360°, etc., which is not limited thereto.

In one optional embodiment, the motor comprises the rotating shaft, a stator module and a motor control module. The rotating shaft comprises the rotating shaft, and the rotating shaft is detachably connected to the brush head. The stator module is magnetically cooperated with the rotating shaft to drive the rotating shaft to rotate, that is, the stator module drives the rotating shaft to rotate. The stator module comprises a permanent magnet or an electromagnet. The motor control module is configured to control the rotating shaft to reciprocate in a circumferential direction, so the rotating shaft is allowed to drive the brush head to rotate within the predetermined range.

Optionally, the motor further comprises a first position sensor configured to detect a position of the rotating shaft. It should be noted that the position of the rotating shaft refers to a deflection angle of the rotating shaft relative to a zero position. The zero position is a default initial position of the rotating shaft. Generally speaking, when the rotating shaft is at the zero position, one side of the brush head with bristles is in a front center of the brush head and is corresponding to the front of the handle. Namely, an included angle between a front surface of the brush head and a front surface of the handle is 0°. Optionally, the first position sensor may be, but is not limited to a Hall sensor, an optical sensor, an angle sensor, or other elements with a position detection function.

As shown in FIG. 2, FIG. 2 is a flow chart of the electronic limit control method of the electric toothbrush according to one embodiment of the present disclosure. The electronic limit control method shown in FIG. 2 is applied to the electric toothbrush shown in FIG. 1. As shown in FIG. 2, the electronic limit control method comprises a step 202.

The step 202 comprises controlling the motor of the electric toothbrush to continuously output the target holding force to enable the brush head of the electric toothbrush being kept at a target position, when the electric toothbrush is in a first state.

The first state comprises one or more of a wake-up state, a stop state, and a manual state.

It should be noted that the wake-up state refers to a state where the electric toothbrush is turned on but is not working. That is, a state where the electric toothbrush is in a standby state and the motor is not started is defined as the wake-up state. The stop state may comprise a natural stop state and a pause state. The natural stop state refers to a state where the motor of the electric toothbrush automatically stops running when a predetermined condition is met. For instance, the motor automatically stops running when a continuous running time of the motor reaches a predetermined time. The predetermined time may be 2 minutes. The pause state refers to a state where the motor of the electric toothbrush stops moving under human intervention or operation. For instance, when the electric toothbrush is in an electric brushing state, the motor is stopped by pressing a corresponding one of control buttons thereof, and the electric toothbrush enters the pause state. After the user presses the corresponding one of the control buttons again, the electric toothbrush is switched to the electric brushing state and continues to run. The manual state refers to a state where the electric toothbrush is used for manual brushing.

When the electric toothbrush is in the first state, the motor is powered on, and a magnetic force is generated between the rotating shaft and the stator module, so that the motor continuously outputs the target holding force to keep the brush head in the target position. Optionally, when the motor is powered on, an electromagnetic force is generated between the rotating shaft and the stator module, so that the target holding force is generated on the rotating shaft.

The stator module may be the permanent magnet. When the motor is not powered on, there is always the magnetic force between the rotating shaft and the stator module. The magnetic force enables the rotating shaft to rotate when the force is applied. The force is less than the target holding force. It should be noted that when the motor is not powered on, the rotating shaft of the motor is able to rotate when the rotating shaft of the motor is under the force. In the embodiment, when the electric toothbrush is in the first state, the motor is controlled to continuously output the target holding force to increase a force value for keeping the brush head in the target position. That is, the target holding force generated on the rotating shaft is greater than the magnetic force that is naturally generated. By providing the target holding force that is relatively large on the rotating shaft, when the user uses the electric toothbrush and when the motor is not powered on, the rotating shaft is still kept in the predetermined position, thereby ensuring the normal use of the electric toothbrush.

Figure 3:
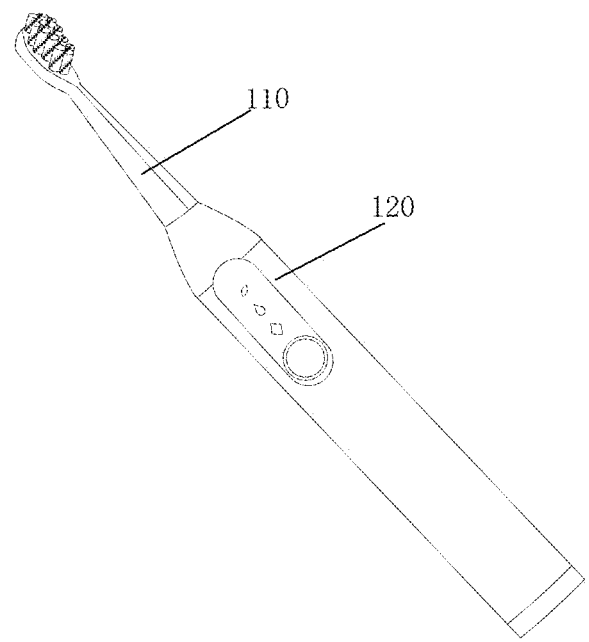
FIG. 3 is a schematic diagram of the electric toothbrush according to one embodiment of the present disclosure.

Optionally, the target position comprises a predetermined position, a position where an included angle between the front surface of the brush head and the front surface of the handle is 0° (as shown in FIG. 1), or a position where an included angle between the front surface of the brush head and the front surface of the handle is 45° (as shown in FIG. 3). It should be noted that the predetermined position is a user-defined position. The user is able to set the target position according to actual usage requirements, so the electric toothbrush adapts with brushing habits of different users and improves user experience. The front surface of the brush head is one side of the brush head with the bristles. Generally, when the user brushes the teeth, the front surface of the handle directly faces the face of the user. Therefore, the target position is set to the position where the included angle between the front surface of the brush head and the front surface of the handle is 45°, so that when the teeth of the user touch the brush head, an included angle between the brush head and the teeth is also 45°, which is in line with a Bass brushing method. Thus, the user is enabled to directly use the Bass brushing method for brushing the teeth without learning nor practicing. Generally speaking, when the rotating shaft is at the zero position, the one side of the brush head with the bristles is in a front center of the brush head, corresponding to the front surface of the handle. That is, the position where the included angle between the front surface of the brush head and the front surface of the handle is 0° is consistent with a shape of most manual toothbrushes and meets usage habits of most users.

In one optional embodiment, the electronic limit control method of the electric toothbrush further comprises: when the electric toothbrush is in the first state, determining a second current position of the rotating shaft through the first position sensor; when a current position of the brush head determined by the second current position of the rotating shaft is not consistent with the target position, determining a target reset path according to the second current position of the rotating shaft and the target position, where the target reset path is a path with a shortest distance; and controlling, based on the target reset path, the brush head to rotate towards the target position until the brush head is rotated to the target position.

The target reset path is a path with a shortest distance from the current position of the brush head to the target position. It should be noted that the second current position is a current position of the rotating shaft. Since the rotating shaft drives the brush head to rotate, a position of the brush head is consistent with the position of the rotating shaft, so that the position of the brush head is determined according to the position of the rotating shaft. When it is determined that the brush head is not in the target position according to the second current position of the rotating shaft, the current position of the brush head is determined according to the second current position, and a position difference between the current position of the brush head and the target position is calculated. The target reset path is determined according to the position difference. For instance, if the current position of the brush head is deflected 20 degrees to the left relative to the target position, the target reset path is a path where the brush head is controlled to rotate 20 degrees to the right, instead of a path where the brush head is deflected 340 degrees to the left, so as to achieve rapid and accurate reset of the brush head, improve accuracy and efficiency of reset of the brush head, and reduce an impact of the reset of the brush head on a normal operation of the electric toothbrush. Specifically, the position of the brush head may refer to a deflection angle of the brush head relative to the target position. The rotating shaft is at the reference position when the brush head is at the target position, and the position of the brush head is represented by the deflection angle of the rotating shaft relative to the reference position.

In the embodiment, the rotating shaft is configured to drive the brush head to rotate. The first position sensor is disposed in the motor to detect the position of the rotating shaft, so as to determine the position of the brush head. When it is determined that the brush head is not in the target position, the target reset path with the shortest distance from the current position of the brush head to the target position is determined to reset the brush head, thereby improving the accuracy and efficiency of reset and reducing the impact of the reset of the brush head on the normal operation of the electric toothbrush.

Optionally, the target holding force is determined according to a brushing pressure and a friction coefficient. The friction coefficient is the friction coefficient between the teeth and the brush head of the electric toothbrush. The brushing pressure refers to a pressure applied by the electric toothbrush to the teeth, or a pressure on the bristles of the brush head. The target holding force is greater than a product of the brushing pressure and the friction coefficient, which prevents the brush head from rotating relative to the handle when the electric toothbrush is in the manual state. Generally, the brushing pressure is in a range of 1.5-3 N (Newton), and the friction coefficient is less than 1. Therefore, a force value of the target holding force is determined to be not less than 3 N, such as 3 N, 4 N, 5 N, or even larger, so that the brush head does not rotate even the user brushes the teeth vigorously.

In one optionally embodiment, before the step of controlling the motor of the electric toothbrush to continuously output the target holding force, the electronic limit control method further comprises steps: obtaining identification information of the brush head, and determining the force value of the target holding force to be output according to the identification information. It should be noted that hardness of the bristles of the brush head, a density of the bristles on the brush head, a total area of the bristles on the brush head, etc. affect the friction coefficient between the teeth and the brush head of the electric toothbrush. Different types of brush heads have different friction coefficients with same teeth. Different types of brush heads have different identification information. By associating the identification information with the friction coefficient, the friction coefficient corresponding to the brush head currently in use is determined through the identification information, thereby determining the force value of the target holding force to be output.

Optionally, the target position may be the position of the brush head before entering the first state. That is, the target holding force is configured to keep the brush head of the electric toothbrush at the current position. It should be noted that when the electric toothbrush is in the first state, the motor is controlled to output the target holding force so that the brush head is kept at the target position before entering the first state. Thus, the electric toothbrush is able to continue to move from the current position of the brush head when switching to the second state. In particular, for the electric toothbrush in the pause state, the motor outputs the target holding force to keep the brush head of the electric toothbrush at the current position, so that the electric toothbrush continues to work when the electric toothbrush is restarted.

In one optional embodiment, the electronic limit control method of the electric toothbrush further comprises a step of stopping outputting the target holding force output by the motor when the electric toothbrush is switched from the first state to the second state. The second state is different from the first state. It should be noted that the second state is different from the first state. States of the electric toothbrush is divided into the first state and the second state, so that the electric toothbrush selectively outputs the target holding force, thereby improving applicability of the electric toothbrush and ensuring that power loss of the electric toothbrush is reduced.

Optionally, the second state comprises one or more of an electric brushing state, an auxiliary function state, a standby state, and an airplane state. It should be noted that the electric brushing state refers to a state where the motor being in a running state. It is understandable that the electric toothbrush has one or more brushing modes, and/or one or more force gears. For instance, the electric toothbrush has the brushing modes and the force gears. The brushing modes comprise a standard cleaning mode, a whitening cleaning mode, and a deep cleaning mode, etc. The force gears comprise a soft gear, a moderate gear, and a strong gear, etc. When one of the brushing modes or one of the force gears of the electric toothbrush is triggered, the electric toothbrush enters the electric brushing state. The standby state refer to a state where most components of the electric toothbrush (such as the motor, a display device, etc.) are not powered. If the electric toothbrush meets a wake-up condition in the standby state, the electric toothbrush enters the wake-up state. The airplane state refers to a state where the electric toothbrush does not respond to most signals (such as a mode selection signal, a gear selection signal, etc.). The electric toothbrush further comprises functional devices (excluding the motor for driving the brush head to rotate), such as a sterilization device, a lighting device, etc. The auxiliary function state refers to a state where at least one of the functional devices of the electric toothbrush is in a running state. For instance, the sterilization device may be an ultraviolet light. Generally, when the user turns on the ultraviolet light, the user does not use the electric toothbrush for brushing. At this time, the motor does not output the target holding force to reduce the power loss of the electric toothbrush. It should be noted that a triggering condition of the standby state may be the same as or different from a triggering condition of the airplane state. For instance, the triggering condition of the standby state is that the electric toothbrush is not moved within a predetermined time, or the electric toothbrush is not held within the predetermined time. The triggering condition of the airplane state is that the user triggers an airplane button of the control buttons on the electric toothbrush, or the electric toothbrush enters the airplane state through voice instructions, etc., which is not limited thereto.

Optionally, the wake-up condition of the electric toothbrush entering the wake-up state is not limited in the embodiments of the present disclosure. For instance, when it is detected that any one of the control buttons disposed on the electric toothbrush is triggered, or when it is detected that the electric toothbrush is held, or when it is detected that the electric toothbrush moves, or when it is detected that the electric toothbrush is separated from a base thereof, etc., the electric toothbrush enters the wake-up state. When the electric toothbrush is in the airplane state, even the electric toothbrush meets the wake-up condition, the electric toothbrush does not switch from the airplane state to the wake-up state, and a state of the rotating shaft in the airplane state is the same as a state of the rotating shaft in the standby state. In a scenario of carrying the electric toothbrush out, the electric toothbrush may move due to accidentally touching any one of the control buttons of the electric toothbrush. By setting the airplane state and switching the electric toothbrush to the airplane state, even if the wake-up condition is met, the electric toothbrush does not switch from the airplane state to the wake-up state, the motor is not powered, the target retention force is not output, and the motor is not in the running state, thereby avoiding power loss when the electric toothbrush is not in use.

In the embodiment, when the electric toothbrush is in the first state, the motor is controlled to continuously output the target holding force, so that the brush head of the electric toothbrush is kept in the target position. The first state comprise one or more of the wake-up state, the stop state, and the manual state. The electric toothbrush comprises the brush head and the motor connected to the brush head. The rotating shaft of the motor is configured to drive the brush head to rotate within a predetermined range. When the electric toothbrush is in the first state, the motor continuously outputs the target holding force. When the external force applied to the brush head is unable to overcome the target holding force on the brush head, the brush head is kept in the target position, which greatly prevents the brush head from rotating in the first state, ensures the normal use of the electric toothbrush, and improves the reliability of the electric toothbrush.

Figure 4:
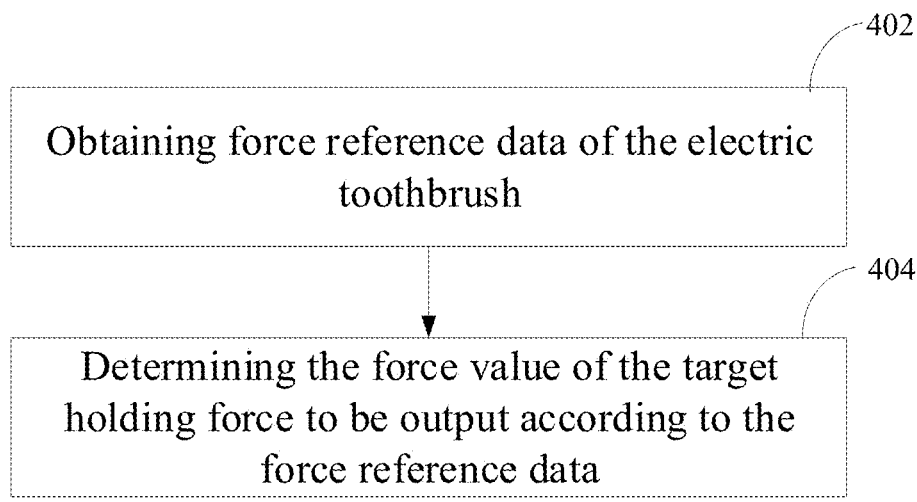
FIG. 4 is a flow chart of a process of determining a force value according to one embodiment of the present disclosure.

As shown in FIG. 4, FIG. 4 is a flow chart of a process of determining the force value of the target holding force according to one embodiment of the present disclosure. Before controlling the motor of the electric toothbrush to continuously output the target holding force, the electronic limit control method of the electric toothbrush further comprises steps 402-404.

The step 402 comprises obtaining force reference data of the electric toothbrush.

It should be noted that the force reference data reflects the pressure on the brush head of the electric toothbrush, or a brushing force that the user of the electric toothbrush is accustomed to. The force reference data comprises at least one of the historical brushing modes of the electric toothbrush in the electric brushing state, the historical force gears of the electric toothbrush operates of the electric toothbrush in the electric brushing state, one or more cached historical force values, and force setting data. The historical brushing modes refer to previous brushing modes when the electric toothbrush is operated in historical moments before a current moment. The historical force gears refer to previous force gears when the electric toothbrush is operated in the historical moments before the current moment. For different brushing modes, operating parameters corresponding to different brushing modes are predetermined. Under different brushing modes, an output torque of the motor is different. Similarly, for different force gears, operating parameters adapted to different force gears are predetermined. Under different force gears, the output torque of the motor is also different. For instance, the operating parameters comprise a duty cycle of a pulse width modulation signal received by the motor. When the electric toothbrush is in different brushing modes or different force gears, the duty cycle of the pulse width modulation signal is different. The output torque of the motor is positively correlated with the duty cycle of the pulse width modulation signal, that is, the greater the duty cycle of the pulse width modulation signal, the greater the output torque of the motor. The one or more historical force values refer to the force value corresponding to the target holding force output by the motor of the electric toothbrush at the historical moments before the current moment. The electric toothbrush is able to adjust the force value of the target holding force according to real-time motion data, so that when the electric toothbrush is in the first state, the brush head of the electric toothbrush does not rotate randomly, while avoids the power loss of the electric toothbrush. Therefore, the force value of the target holding force that matches the user is determined according to the one or more historical force values. The force setting data refers to data received from a terminal device. The user is able to personalize the force value of the target holding force in advance through the terminal device to meet the actual needs. It is understandable that the terminal device is in communication with the electric toothbrush, so that the electric toothbrush is allowed to obtain the force setting data.

Optionally, the electric toothbrush is configured to store at least one of the historical brushing modes, the historical force levels, and the historical force values. A maximum storage quantity of the historical brushing modes, a maximum storage quantity of the historical force levels, and a maximum storage quantity of the historical force values are predetermined in the electric toothbrush. When the maximum storage quantity is reached, an earliest stored data thereof is deleted. Exemplarily, if the maximum storage quantity of historical brushing modes is 20, when the storage quantity of historical brushing modes reaches 20, an earliest stored historical brushing mode of the historical brushing modes is deleted to store a latest historical brushing mode without occupying too much storage space.

The step 404 comprises determining the force value of the target holding force to be output according to the force reference data.

In one optional embodiment, the force reference data comprises the historical brushing modes and/or the historical force gears of the electric toothbrush during operation. The step of determining the force value of the target holding force to be output according to the force reference data comprises a step of determining the force value of the target holding force to be output according to the historical brushing modes and/or the historical force gears. The force value of the target holding force is positively correlated with the operating parameters of the historical brushing modes and/or the operating parameters of historical force gears, of the motor.

It should be noted that the force value of the target holding force to be output of the electric toothbrush is determined according to the one or more historical brushing modes, or according to the one or more historical force gears, or according to the one or more historical brushing modes and the one or more historical force gears. The greater the duty cycle of the pulse width modulation signal corresponding to the force gear frequently used by the user, the greater the brushing force the user is accustomed to. The greater the duty cycle of the pulse width modulation signal corresponding to the brushing mode frequently used by the user, the greater the brushing force the user is accustomed to. As a result, the force value of the target holding force output by the motor is greater accordingly, so as to avoid the electric toothbrush from rotating when the electric toothbrush is in the manual state, and to meet the requirement of manual brushing with the electric toothbrush.

Optionally, a target historical brushing mode is determined from the historical brushing modes. According to operating parameters of the target historical brushing mode, the force value of the target holding force to be output is determined. A target historical force gear is also determined from thee historical force gears, and the force value of the target holding force to be output is determined according to operating parameters of the target historical force gear. The target historical brushing mode is a brushing mode with a largest number in the historical brushing modes, and the target historical force gear is a force gear with a largest number in the historical force gears. For example, the electric toothbrush stores 14 historical brushing modes, including 10 standard cleaning modes, 2 whitening cleaning modes and 2 deep cleaning modes, and the target historical brushing mode is the standard cleaning mode. Since the output torque of the motor is positively correlated with the duty cycle of the pulse width modulation signal, the force value of the target holding force to be output is determined according to the target historical force gear and/or the target historical brushing mode.

In one optional embodiment, the electric toothbrush is predetermined with sixth force values one-to-one corresponding to the brushing modes, and/or the electric toothbrush is predetermined with seventh force values one-to-one corresponding to the force gears. When the electric toothbrush determines the target historical brushing mode and/or the target historical force gear, one of the sixth force values corresponding to the target historical brushing mode and/or one of the seventh force values corresponding to the target historical force gear is queried. The one of the sixth force values or the one of the seventh force values is determined as the force value of the target holding force to be output. Alternatively, an average value of the one of the sixth force values corresponding to the target historical brushing mode and the one of the seventh force values corresponding to the target historical force gear is calculated, and the average value thereof is used as the force value of the target holding force to be output.

In one optional embodiment, the step of determining the force value of the target holding force to be output according to the historical brushing modes and/or the historical force gears comprises steps of determining a second pressure value according to the operating parameters corresponding to the historical brushing modes and/or the operating parameters corresponding to the historical force gears, and determining the force value of the target holding force to be output according to the second pressure value and a predetermined friction coefficient. It should be noted that the operating parameters of the motor affects the output torque of the motor, thereby affecting the pressure between the brush head and the teeth. Therefore, the second pressure value is determined according to the operating parameters corresponding to the historical brushing modes and/or the operating parameters corresponding to the historical force gears, and the force value of the target holding force to be output is determined according to the second pressure value and the predetermined friction coefficient.

In one optional embodiment, the force reference data comprises the one or more historical force values cached in the electric toothbrush. The step of determining the force value of the target holding force to be output according to the force reference data comprises a step of determining the force value of the target holding force to be output according to the one or more historical force values. Optionally, an average value of the one or more historical force values is calculated, and the average value of the one or more historical force values is determined as the force value of the target holding force to be output. It is understandable that, if there is only one historical force value, the one historical force value is determined as the force value of the target holding force.

Optionally, a weight of each of the historical force values is determined according to the historical moments corresponding to the historical force values. A weighted average value of the historical force values is determined according to the historical force values and the weight of each of the historical force values. The weighted average value of the historical force values is determined as the force value of the target holding force to be output. Each of the historical force values is matched with a corresponding historical moment. Since the brushing habit of the user may change, the force reference data closer to the current moment better reflects current needs of the user. By assigning a larger weight to one of the historical force values corresponding to a relatively later historical moment (a time difference between the later historical moment and the current moment is small), it is ensured that the one of the historical force values closer to the current moment has a greater role in determining the force value of the target holding force, thereby improving the accuracy of the force value of the target holding force to be output.

In one optional embodiment, the force reference data comprises the force setting data. The step of determining the force value of the target holding force to be output according to the force reference data comprise a step of determining the force value of the target holding force to be output according to the force setting data. Optionally, the force value indicated by the force setting data is determined as the force value of the target holding force to be output.

In one optional embodiment, the force reference data comprises a selected brushing mode in the first state and/or a selected force gear in the first state. The step of determining the force value of the target holding force to be output according to the force reference data comprises a step of determining the force value of the target holding force to be output according to a third predetermined torque corresponding to the selected brushing mode and/or a fourth predetermined torque corresponding to the selected force gear. The force value of the target holding force is positively correlated with the third predetermined torque and/or the force value of the target holding force is positively correlated with the fourth predetermined torque.

It should be noted that in the first state, although the motor is not in the running state, the motor may correspond to the selected brushing mode and/or the selected force gear. For example, in the pause state, the electric toothbrush is in the standard cleaning mode, and the user takes the brush head out of the oral cavity. At this time, the electric toothbrush enters the pause state, and the selected brushing mode in the pause state is the standard cleaning mode. Each of the brushing modes is provided with a corresponding third predetermined torque, and each of the force gears is provided with a corresponding fourth predetermined torque. The third predetermined torque matches and the fourth predetermined torque are matched with the operating parameters corresponding to the force gears and the brushing modes. That is, when the selected force gear and the selected brushing mode with a large output torque of the motor have a large predetermined torque assigned thereto, so as to ensure the accuracy of the force value of the target holding force to be output.

It is understandable that various force reference data may be mixed and referenced to jointly determine the force value of the target holding force to be output, so as to improve the accuracy of the force value of the target holding force to be output. Specifically, the force reference data comprises the historical force values and the force setting data. The step of determining the force value of the target holding force to be output according to the force reference data comprises steps of calculating an average value of the historical force values, and determining a larger one of the average value of the historical force values and the force value corresponding to the force reference data as the force value of the target holding force to be output. It should be noted that the user may adopt a relatively gentle brushing method at the historical moments, but in some cases, the user may suddenly need to brush the teeth with greater force (such as according to a doctor's advice). In these cases, the user is bale to adjust the force value of the target holding force to be output through the terminal device to meet the needs of the user. If the time from the setting of the force reference data is long, and the user gradually increases the brushing force, at this time, the average value of the historical force values is greater than the force value corresponding to the force reference data. The force value of the target holding force is determined based on the average value of the historical force values, which also meets the needs of the user. In the embodiment, no matter which case, the needs of the user are met, which greatly improves the reliability of the electric toothbrush and ensures the normal operation of the electric toothbrush.

In the embodiment, the force value of the target holding force to be output is determined according to the force reference data of the electric toothbrush. The force value of the target holding force is adapted to the user while ensuring that the electric toothbrush does not rotate randomly when the electric toothbrush is in the first state. Further, it avoids the force value of the target holding force being too large and avoids the power loss of the electric toothbrush.

Figure 5:
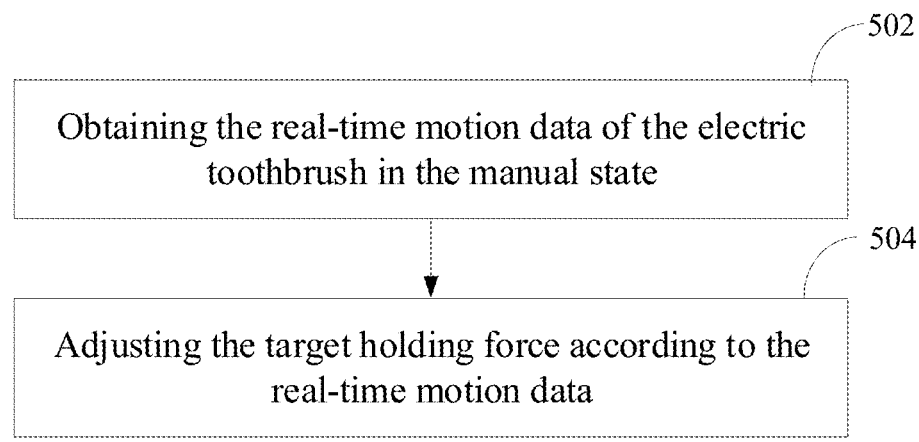
FIG. 5 is a flow chart of a process of adjusting a target holding force according to one embodiment of the present disclosure.

As shown in FIG. 5, FIG. 5 is a flow chart of a process of adjusting a target holding force according to one embodiment of the present disclosure. After the step of controlling the motor of the electric toothbrush to continuously output the target holding force, the electronic limit control method further comprises steps 502-504.

The step 502 comprises obtaining the real-time motion data of the electric toothbrush in the manual state.

The step 504 comprises adjusting the target holding force according to the real-time motion data.

It should be noted that when the electric toothbrush is in the manual state, that is, when the user brushes the teeth manually with the electric toothbrush, the external force on the brush head may change. In order to reduce a power consumption of the electric toothbrush (the greater the target retention force output by the motor, the more power is consumed) and to ensure that the brush head is located at the target position when the electric toothbrush is in the manual state, the target holding force is adjusted according to the real-time motion data. The real-time motion data refers to the motion data of the electric toothbrush driven by the user.

The real-time motion data comprises at least one of a first pressure value of the bristles, a first current position of the rotating shaft, and the current position of the brush head in the oral cavity. Optionally, the electric toothbrush further comprises a pressure detection sensor. The pressure detection sensor is configured to detect the pressure on the bristles of the brush head. The first pressure value is detected by the pressure detection sensor of the electric toothbrush. The first current position of the rotating shaft is the current position of the rotating shaft detected by the first position sensor. Optionally, the electric toothbrush further comprises a second position sensor configured to detect the position of the brush head in the oral cavity. For instance, the second position sensor comprises an image sensor configured to collect an image of an interior of the oral cavity. The electric toothbrush determines the position of the oral cavity where the brush head is currently located by analyzing and identifying image features of the image of the interior of the oral cavity. Optionally, the image sensor is disposed on the brush head.

In one optional embodiment, the real-time motion data comprises the first pressure value of the bristles. The step of adjusting the target holding force according to the real-time motion data comprises steps of when the first pressure value is less than a target pressure value, determining a first force value according to a difference between the target pressure value and the first pressure value, and reducing the target holding force output by the motor to the first force value, where the target pressure value being related to a force value of the target holding force; and when the first pressure value is greater than the target pressure value, determining a second force value according to the difference between the first pressure value and the target pressure value, and rising the target holding force output by the motor to the second force value. The target pressure value is related to the force value of the target holding force. It should be noted that when the electric toothbrush is in the manual state, the greater the pressure on the bristles, the greater the force exerted by the teeth on the brush head. Therefore, if the force exerted by the teeth on the brush head is greater than the target holding force of the motor, the brush head rotates. If the first pressure value is greater than the target pressure value, the greater a difference between the first pressure value and the target pressure value, the greater an amplitude required to rise the target holding force. By determining the second force value by the difference between the first pressure value and the target pressure value, it is ensured that the second force value is not too large nor too small. For instance, the second force value is a sum of an initial force value and a first adjustment force value. The first adjustment force value is a product of the predetermined friction coefficient and a first difference. The first difference is a difference between the first pressure value and the target pressure value. If the first pressure value is less than the target pressure value, the force value of the target holding force must be reduced, thereby reducing the power loss of the electric toothbrush. Optionally, the first force value is the difference between the initial force value and a second adjustment force value. The second adjustment force value is a product of the predetermined friction coefficient and a second difference. The second difference is a difference between the target pressure value and the first pressure value. The initial force value is a current force value of the target holding force.

In one optional embodiment, the real-time motion data comprises the first current position of the rotating shaft. The step of adjusting the target holding force according to the real-time motion data comprises steps of when the current position of the brush head determined by the first current position of the rotating shaft is not consistent with the target position, determining a third force value according to a difference between the first current position and the target position; and adjusting the target holding force output by the motor to the third force value. It should be noted that the position of the rotating shaft corresponds to the position of the brush head. When the brush head is in the target position, it is determined that the rotating shaft is in the target position. If the current position of the rotating shaft is not the target position, it is determined that the current force value of the target holding force is small. By determining the difference between the first current position and the target position, that is, determining a rotation angle of the rotating shaft, the force on the bristles is determined. Then, the target holding force output by the motor is increased to reset the brush head and keeps the brush head in the target position.

In one optional embodiment, the real-time motion data comprises the current position of the brush head in the oral cavity. The step of adjusting the target holding force according to the real-time motion data comprises steps of when the current position of the brush head is a tongue coating position, adjusting the target holding force output by the motor to a fourth force value; and when the current position of the brush head is a tooth position, adjusting the target holding force output by the motor to a fifth force value. The fourth force value is less than the fifth force value. It should be noted that when the user manually brushes the teeth, the force for cleaning the tongue coating is generally less than the force for cleaning the teeth. Therefore, when the user uses the electric toothbrush to clean the tongue coating, the force value of the target holding force is made relatively small, and when the user uses the electric toothbrush to clean the teeth, the force value of the target holding force is made relatively large, which ensures that the brush head does not rotate randomly when the user uses the electric toothbrush to manually brush the oral cavity. At the same time, it further reduce the power loss of the electric toothbrush so that the electric toothbrush without the mechanical limit device well meets the needs of the user for manual brushing.

Optionally, the fifth force value is allowed to be determined by the steps 402-404, and the fourth force value is a difference between the fifth force value and a predetermined force value set by the user. When the user cleans the tongue coating, the force value of the target holding force is reduced to ensure that the brush head does not rotate while reducing the power loss of the electric toothbrush.

In the embodiment, when the electric toothbrush is in the manual state, the force value of the target holding force of the motor is adjusted in real time by obtaining the real-time motion data, thereby ensuring that the brush head does not rotate randomly during a manual brushing process, while reducing the power loss of the electric toothbrush.

Figure 6:
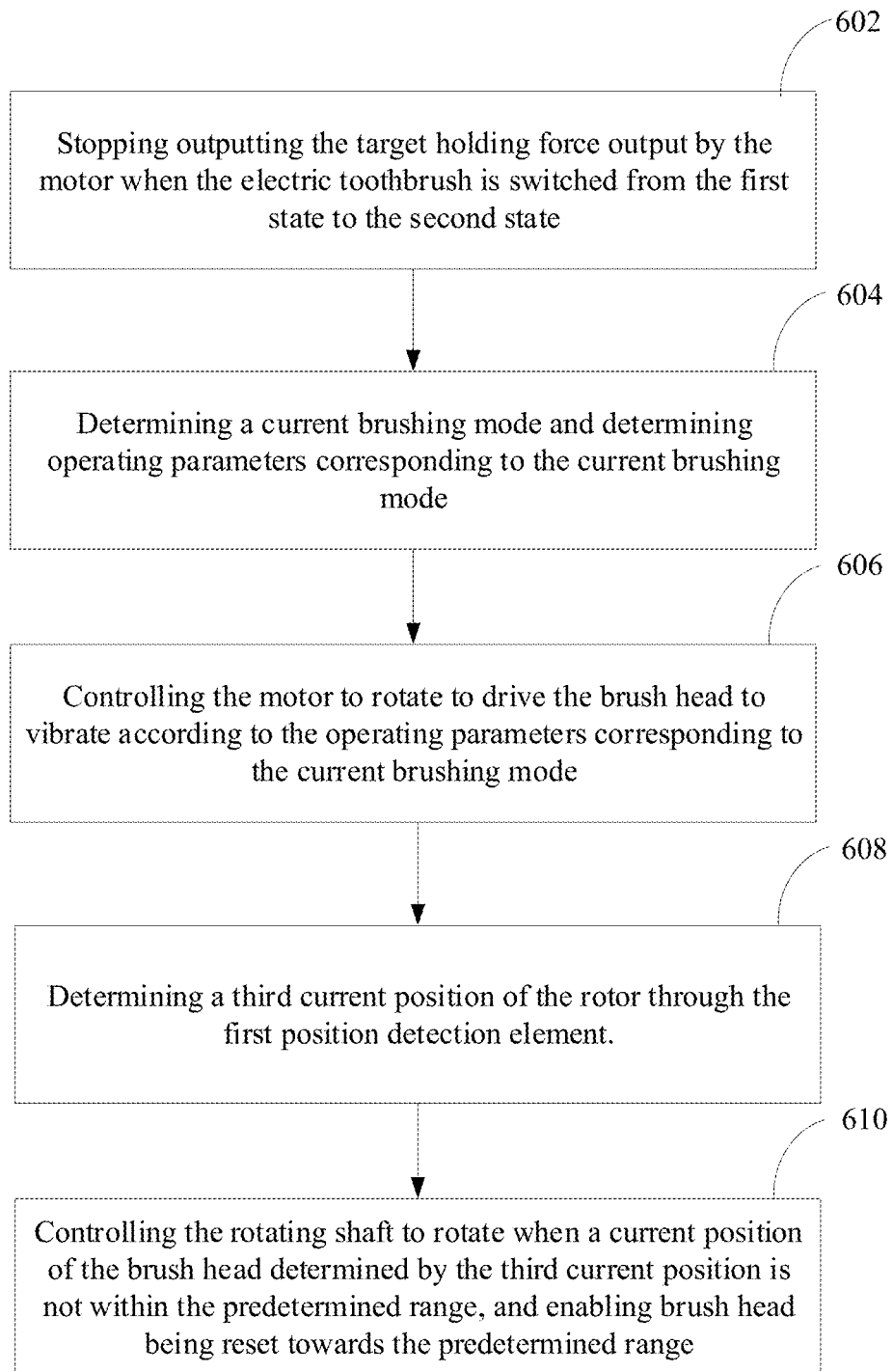
FIG. 6 is a flow chart of a brushing process of the electric toothbrush according to one embodiment of the present disclosure.

As shown in FIG. 6, FIG. 6 is a flow chart of a brushing process of the electric toothbrush according to one embodiment of the present disclosure. The electronic limit control method of the electric toothbrush further comprises steps 602-606.

The step 602 comprises stopping outputting the target holding force output by the motor when the electric toothbrush is switched from the first state to the second state.

The step 604 comprises determining a current brushing mode and determining operating parameters corresponding to the current brushing mode.

It should be noted that the operating parameters corresponding to the current brushing mode refer to the operating parameters of the motor in the current brushing mode. The user is able to select the current brushing mode through voice or pressing the control buttons disposed on the electric toothbrush. The electric toothbrush determines the current brushing mode by collecting ambient audio or detecting information transmitted by the control buttons that are triggered on the electric toothbrush. The motion of the motor of the electric toothbrush is divided into vibration and rotation. The rotation of the motor is mainly to adjust the reference position of the rotating shaft. The vibration of the motor is a reciprocating motion for cleaning the oral cavity. Each of the brushing modes is pre-configured with corresponding operating parameters, and the operating parameters comprise the duty cycle of the pulse width modulation signal, vibration parameters, and rotation parameters, etc., which are not limited thereto.

Figure 7A:
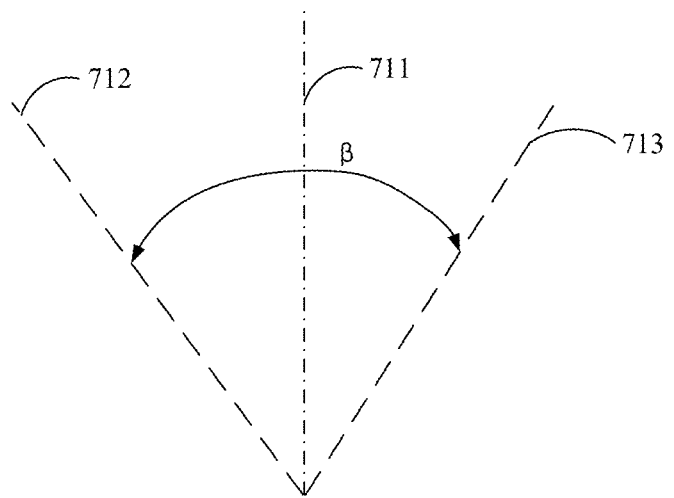
FIG. 7A is a schematic diagram of a rotating shaft vibrating back and forth with a first reference position as a vibration axis according to one embodiment of the present disclosure.

As shown in FIG. 7A, the rotating shaft vibrates with a first reference position 711 as a vibration axis. A cover range that the rotating shaft vibrates with the first reference position 711 as the vibration axis is defined as a vibration range β. The position of the rotating shaft changes back and forth between a first position 712 and a second position 713. The vibration range 3 corresponds to a cleaning area of the brush head. For example, the rotating shaft vibrates with the first reference position 711 as the vibration axis, which means that the rotating shaft is vibrated from the first reference position 711 in a clockwise vibration direction to the first position 712, then the rotating shaft is vibrated from the first position 712 in a counterclockwise vibration direction to the second position 713, and then the rotating shaft rotates from the second position 713 in a clockwise rotation direction to the first reference position 711. The process thereof is considered as a reciprocating vibration. The rotating shaft performs reciprocating vibrations within a vibration cycle, and the reference position within the vibration cycle remains unchanged.

Figure 7B:
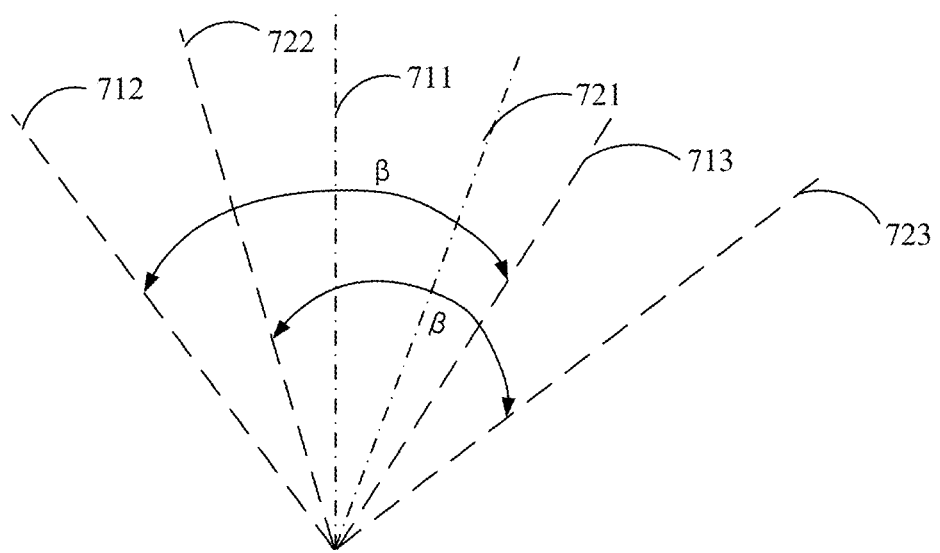
FIG. 7B is a schematic diagram of the rotating shaft vibrating back and forth with a first reference position as a vibration axis according to one embodiment of the present disclosure.

As shown in FIG. 7B, the reference position is changed by controlling the rotating shaft to rotate, so that the brush head covers more areas to be cleaned, enabling the electric toothbrush to have a larger cleaning area. For example, the rotating shaft is controlled to rotate to switch the reference position from the first reference position 711 to the second reference position 721. At this time, the rotating shaft vibrates with the second reference position 721 as the vibration axis, and the cover range that the rotating shaft vibrates with the second reference position 721 as the vibration axis is defined as the vibration range β, and the position of the rotating shaft changes back and forth between a third position 722 and a fourth position 723.

Optionally, the vibration parameters comprise but are not limited to one or more of a vibration direction, a vibration range, a vibration frequency, a duration corresponding to the vibration cycle, etc. The vibration direction comprises the clockwise vibration direction and counterclockwise vibration direction of the rotating shaft in the circumferential direction. The clockwise vibration direction is opposite to the counterclockwise vibration direction. The vibration range refers to an angle corresponding to a single reciprocating vibration of the rotating shaft in the circumferential direction. Taking FIG. 7A as an example, the vibration range refers to an included angle between the first position 712 and the second position 713. The vibration range is understood as a vibration amplitude corresponding to the single vibration cycle. The vibration frequency refers to a quantity of times the rotating shaft reciprocates in the single vibration cycle. Optionally, the rotation parameters comprise but are not limited to one or more of a rotation direction, a rotation angle, a rotation frequency, etc. The rotation direction comprises the clockwise rotation direction and counterclockwise rotation direction of the rotating shaft in the circumferential direction, and the clockwise rotation direction is opposite to the counterclockwise rotation direction. The rotation angle refers to an angle corresponding to the rotating shaft when the rotating shaft switch the reference position. Taking FIG. 7B as an example, the rotation angle in an included angle between the second reference position 721 and the first reference position 711. The rotation frequency refers to a quantity of times the reference position is switched per unit time. For example, the rotation frequency may be 5 times/second, 8 times/second, 10 times/second, etc., which is not limited thereto.

The step 606 comprises controlling the motor to rotate to drive the brush head to vibrate according to the operating parameters corresponding to the current brushing mode.

When the electric toothbrush is in the electric brushing state, a driving force output by the motor is greater than the target holding force. It should be noted that each of the brushing modes of the electric toothbrush is pre-configured with the corresponding operating parameters for the motor. The operating parameters comprise but are not limited to the duty cycle of the pulse width modulation signal, the vibration parameters, and the rotation parameters to achieve different cleaning effects. When the electric toothbrush is in the electric brushing state, the driving force output by the motor is greater than the target holding force, that is, when the electric toothbrush is in the electric brushing state, the output torque of the motor is greater than the output torque of the motor when the electric toothbrush is in the first state, thereby avoiding human damage to the moving of the motor according to the corresponding operating parameters, ensuring that the cleaning effect corresponding to the current brushing mode is achieved, and improving the reliability of the electric toothbrush.

In one optional embodiment, a fourth current position of the rotating shaft is determined through the first position sensor when the electric toothbrush is in the electric brushing state. If the position of the brush head is not within the predetermined range according to the forth current position, the rotating shaft is controlled to rotate based on the fourth current position to enable the brush head being rotated within the predetermined range. It should be noted that when the motor is not in the running state, the motor is not powered on. Since there is no mechanical limit device, the rotating shaft is rotatable 360 degrees. When the electric toothbrush is in the electric brushing state, the rotating shaft is rotated by transmitting different electrical signals to the electric toothbrush. For example, the rotation direction of the rotating shaft is changed by applying opposite electrical signals. In the embodiment, the first position sensor configured to detect the position of the rotating shaft is disposed on the motor, which realizes closed-loop control of the rotation of the rotating shaft and realizes electronic limit of the rotating shaft.

In one optional embodiment, the step of controlling, based on the fourth current position, the rotating shaft to rotate to enable the brush head being rotated within the predetermined range comprises a step of controlling, based on the fourth current position, the rotating shaft to reciprocate and vibrate within a vibration range with a reference position as a vibration axis, and controlling the rotating shaft to reciprocate and rotate to adjust the reference position. For instance, when the electric toothbrush is in the electric brushing state, the electric toothbrush obtains the rotation parameters corresponding to the current brushing mode and the vibration parameters corresponding to the current brushing mode. Then, the electric toothbrush control the rotating shaft to vibrate back and forth with the reference position as the vibration axis based on the vibration parameters, and controls the rotating shaft to rotate based on the rotation parameters to switch the reference position. That is, the vibration axis of the electric toothbrush is changed, so that the cleaning area of the electric toothbrush is larger. Optionally, the vibration range is less than the predetermined range. As shown in FIG. 7B, the vibration range refers to the included angle between the first position 712 and the second position 713. Since the brush head rotates under the drive of the rotating shaft of the motor, the predetermined range corresponds to the rotation range of the rotating shaft of the motor. When the reference position only comprises the first reference position 711 and the second reference position 721, the predetermined range is the included angle between the first position 712 and the fourth position 723.

Optionally, the reciprocating vibration frequency of the rotating shaft is greater than the reciprocating rotation frequency the rotating shaft, that is, a switching frequency of the reference position is less than the reciprocating vibration frequency of the rotating shaft. Since the rotating shaft vibrates back and forth to clean the teeth, the reciprocating vibration frequency of the rotating shaft is relatively high, which improves the cleaning effect of the electric toothbrush. The switching of the reference position is to change the cleaning area, so the reciprocating rotation frequency of the rotating shaft is relatively low, so that the cleaning area is sufficiently cleaned to ensure the cleaning effect.

In one optional embodiment, before the step of controlling the motor to move according to the operating parameters corresponding to the current brushing mode, the electronic limit control method of the electric toothbrush further comprises steps of determining the current position of the rotating shaft by the first position sensor, and controlling the rotating shaft to rotate until the rotating shaft is at the zero position, when the current position of the rotating shaft is not the zero position. It should be noted that the operating parameters of the motor are different in different brushing modes. Before controlling the motor to move according to the operating parameters corresponding to the current brushing mode, the rotating shaft is reset to the zero position, which enables the motor to have the initial reference position that is accurate and is conducive to accurate closed-loop control of the rotating angle of the motor.

In the embodiment, when the electric toothbrush is in the electric brushing state, the operating parameters of the motor is determined according to the current brushing mode of the electric toothbrush, and the motor is controlled to move based on the operating parameters. At the same time, it is ensured that the driving force output by the motor when the electric toothbrush is in the electric brushing state is greater than the target holding force, thereby avoiding human intervention in the rotation of the motor and ensuring that the cleaning effect corresponding to the current brushing mode is achieved.

In one optional embodiment, as shown in FIG. 6, after the step of controlling the motor to rotate to drive the brush head to vibrate according to the operating parameters corresponding to the current brushing mode, the electronic limit control method further comprises steps 608-610.

The step 608 comprises determining a third current position of the rotating shaft through the first position sensor.

It should be noted that the third current position is the current position of the rotating shaft, or a real-time position of the rotating shaft in the circumferential direction. The electric toothbrush is able to obtain the current position of the rotating shaft through the first position sensor.

The step 610 comprises controlling the rotating shaft to rotate when a current position of the brush head determined by the third current position is not within the predetermined range, and enabling the brush head being reset towards the predetermined range.

A reset force controlling the brush head to reset to the predetermined range is greater than the target holding force.

It should be noted that, since the position of the rotating shaft is corresponding to the position of the brush head, it is determined whether the brush head is within the predetermined range according to the current position of the rotating shaft. When the brush head is not within the predetermined range, the rotating shaft is controlled to rotate to drive the brush head to reset toward the predetermined range. The reset force of the brush head toward the predetermined range refers to the output torque of the motor in a process of resetting the brush head toward the predetermined range. The motor provides the reset force greater than the target holding force to the brush head, which ensures that the brush head is reset toward the predetermined range. The electric toothbrush is pre-configured with the predetermined range. The predetermined range is configured to limit a position range of the rotating shaft in the circumferential direction. During the operation of the electric toothbrush, the brush head may sometimes exceed the predetermined range due to the external force, thereby causing the electric toothbrush to fail to operate normally, affecting the stability and safety of the electric toothbrush, and affecting the cleaning effect of the electric toothbrush. Therefore, in the embodiment of the present disclosure, when the electric toothbrush determines that the brush head is not within the predetermined range according to the third current position, the rotating shaft is controlled to rotate so as to drive the brush head to reset toward the predetermined range, which realize electronic limit of the electric toothbrush and improves the stability and safety of the electric toothbrush without the mechanical limit device.

For instance, when the rotating shaft rotates within a target position range, the brush head rotates within the predetermined range. The target position range refers to a range between a fifth position and a sixth position. The fifth position and the sixth position are understood as extreme position points of the rotating shaft. When the current position of the rotating shaft exceeds the fifth position or the sixth position, that is, the current position of the rotating shaft is not between the fifth position and the sixth position, the current position of the rotating shaft exceeds the target position range, and the rotating shaft and the brush head need to be reset. The zero position of the rotating shaft is a midpoint position between the fifth position and the sixth position. It should be noted that the zero position of the rotating shaft may also be the fifth position or the sixth position. The target position range (i.e., a position difference between the fifth position and the sixth position) may be determined according to actual needs. The target position range may be a fixed value or may change dynamically according to needs, which is not limited thereto.

In the embodiment, the electric toothbrush is able to determine the current position of the rotating shaft of the motor through the first position sensor. When the current position of the rotating shaft is not within the target position range, the rotating shaft is controlled to reset toward the target position range. When the position of the rotating shaft exceeds the target position range, the rotating shaft is reset to ensure that the position of the rotating shaft is within the target position range, that is, to ensure that the brush head is within the predetermined range. Therefore, in a situation where the electric toothbrush cannot work normally due to the rotating shaft of the motor exceeding the target position range is avoided, which improves the stability and safety of the electric toothbrush and ensures the normal operation of the electric toothbrush.

Figure 8:
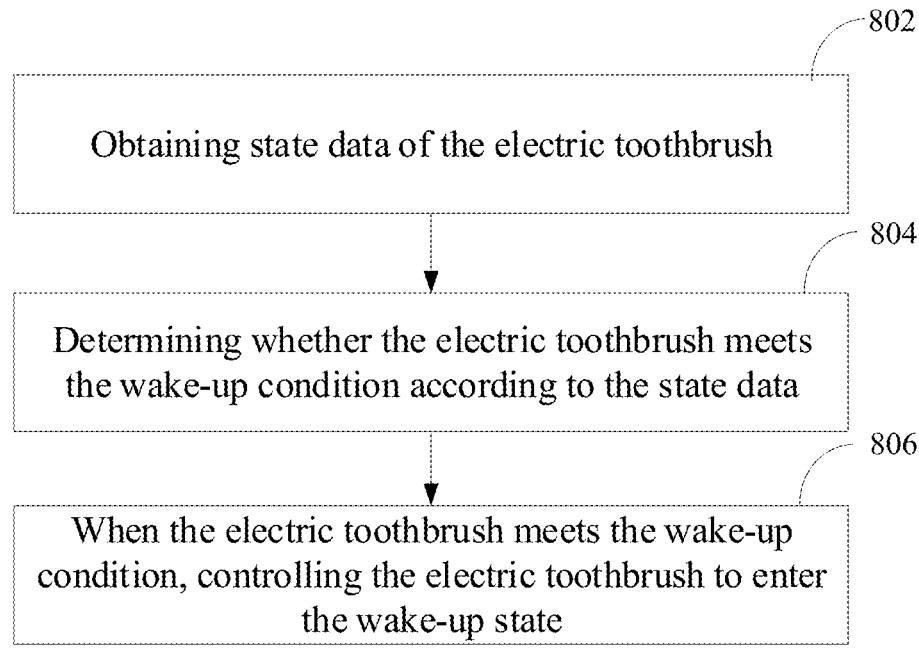
FIG. 8 is a flow chart of an automatic wake-up process of the electric toothbrush according to one embodiment of the present disclosure.

FIG. 8 is a flow chart of an automatic wake-up process of the electric toothbrush according to one embodiment of the present disclosure. As shown in FIG. 8, when the electric toothbrush is in the first state, before controlling the motor to continuously output the target holding force, the electronic limit control method of the electric toothbrush further comprises steps 802-806.

The step 802 comprises obtaining state data of the electric toothbrush.

Optionally, the electric toothbrush further comprises a detection module configured to collect the state data of the electric toothbrush. The electric toothbrush obtains the state data of the electric toothbrush through the detection module. Optionally, the detection module comprises a motion sensor, a gyroscope, an acceleration sensor, etc., to detect a motion state of the electric toothbrush. The detection module may further comprise a piezoelectric sensor, a temperature sensor, a contact sensor, a photoelectric sensor, etc., to detect whether the electric toothbrush is held. The detection module may further comprises a Hall sensor, a radio frequency (RF) sensor, a conductive contact, etc., to detect whether the electric toothbrush is separated from the base. Optionally, the state data comprises the motion data, holding data, and connection data with other components. The motion data comprises, but is not limited to an acceleration, a speed, and a displacement of the electric toothbrush. The holding data comprises but is not limited to a pressure of a holding position of the electric toothbrush and a temperature of the holding position of the electric toothbrush.

The step 804 comprises determining whether the electric toothbrush meets the wake-up condition according to the state data.

The step 806 comprises when the electric toothbrush meets the wake-up condition, controlling the electric toothbrush to enter the wake-up state.

It should be noted that the description of the wake-up condition may refer to the description in above embodiments, which is not repeatedly depicted herein. When the electric toothbrush is in the airplane state, even if the electric toothbrush meets the wake-up condition, the electric toothbrush is not controlled to enter the wake-up state.

Optionally, when the electric toothbrush is in the airplane state, the detection module does not work. Specifically, when the electric toothbrush is in the airplane state, the detection module is controlled not to work, so as to prevent the electric toothbrush from switching from the airplane state to the wake-up state when the electric toothbrush meets the wake-up condition. For instance, the detection module is controlled not to work by disconnecting a power supply circuit of the detection module to shut down the detection module.

Optionally, when the electric toothbrush is in the airplane state, the electric toothbrush is not controlled to enter the wake-up state even the electric toothbrush meets the wake-up condition. It should be noted that in the embodiment, the detection module is allowed to work in the airplane state, but the electric toothbrush does not enter the wake-up state when the wake-up condition is met.

In the embodiment, when it is detected that the electric toothbrush meets the wake-up condition, such as being moved, being held, or being separated from the base, the electric toothbrush is controlled to automatically enter the wake-up state, and then the motor is controlled to output the target retention force, so that after the user picks up the electric toothbrush, regardless of whether the motor is in the running state, the user is able to clean the oral cavity manually.

Figure 9:
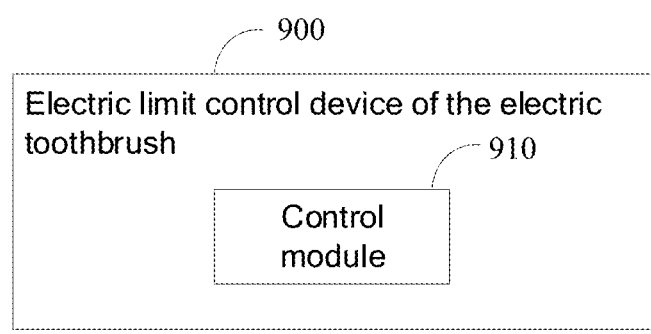
FIG. 9 is a box diagram of an electronic limit control device of the electric toothbrush according to one embodiment of the present disclosure.

FIG. 9 is a box diagram of an electronic limit control device of the electric toothbrush according to one embodiment of the present disclosure. As shown in FIG. 9, the electronic limit control device is applied to the electric toothbrush as shown in FIG. 1. The electric toothbrush comprises the brush head and the motor. The brush head is connected to the motor. The rotating shaft of the motor is able to rotate 360° in the non-powered state, and the rotating shaft of the motor is configured to drive the brush head to rotate within the predetermined range. As shown in FIG. 9, the electronic limit control device 900 of the electric toothbrush comprises a control module 910. The control module 910 is configured to control the motor of the electric toothbrush to continuously output the target holding force to enable the brush head of the electric toothbrush being kept at the target position, when the electric toothbrush is in the first state. The first state comprises one or more of the wake-up state, the stop state, and the manual state.

Specifically, the rotating shaft of the motor is rotatable within a predetermined angle range under the force when not powered on. The rotating shaft of the motor is rotatable by 10°, 15°, 20°, 30°, 45°, 60°, 75°, 90°, 120°, 150°, 180°, 360°, etc., which is not limited thereto.

In one optional embodiment, the rotating shaft of the motor is able to rotate in the non-powered state under the force, and the force is less than the target holding force.

In one optional embodiment, the electronic limit control device 900 of the electric toothbrush further comprises a first acquisition module and a first determination module. The first acquisition module is configured to obtain the force reference data of the electric toothbrush before controlling the motor to continuously output the target holding force. The first determination module is configured to determine the force value of the target holding force to be output according to the force reference data.

In one optional embodiment, the force reference data comprises the historical brushing modes of the electric toothbrush in the electric brushing state and the historical force gears of the electric toothbrush operates of the electric toothbrush in the electric brushing state. The motor has different operating parameters in different brushing modes and different force gears. The first determination module is further configured to determine the force value of the target holding force to be output according to the historical brushing modes and/or the historical force gears. The force value of the target holding force is positively correlated with the operating parameters of the motor corresponding to the historical brushing modes and/or the historical force gears.

In one optional embodiment, the force reference data comprises the one or more historical force values cached in the electric toothbrush. The one or more historical force values are one or more force values corresponding to the target holding force output by the motor at the historical moments before the current moment. The first determination module is further configured to determine the force value of the target holding force to be output according to the one or more historical force values.

In one optional embodiment, the force reference data comprises the force setting data. The force setting data is data received from the terminal device. The first determination module is further configured to determine the force value of the target holding force to be output according to the force setting data. Alternatively, the force reference data comprises the selected brushing mode in the first state and/or the selected force gear in the first state. The first determination module is further configured to determine the force value of the target holding force to be output according to the third predetermined torque corresponding to the selected brushing mode and/or the fourth predetermined torque corresponding to the selected force gear. The force value of the target holding force is positively correlated with the third predetermined torque and/or the force value of the target holding force is positively correlated with the fourth predetermined torque.

In one optional embodiment, the electronic limit control device 900 of the electric toothbrush further comprises a second acquisition module and an adjustment module. The second acquisition module is configured to obtain the real-time motion data of the electric toothbrush in the manual state after the motor of the electric toothbrush is controlled to continuously output the target holding force. The adjustment module is configured to adjust the target holding force according to the real-time motion data.

In one optional embodiment, the real-time motion data comprises at least one of the first pressure value of bristles, the first current position of the rotating shaft, and the current position of the brush head in the oral cavity. The first pressure value is detected by the pressure detection sensor of the electric toothbrush, and the pressure detection sensor is configured to detect the pressure applied to the bristles of the brush head. The first current position of the rotating shaft is detected by the first position sensor. The motor comprises the first position sensor and the rotating shaft. The first position sensor is configured to detect the position of the rotating shaft. The current position of the brush head in the oral cavity is detected by the second position sensor.

In one optional embodiment, the real-time motion data comprises the first pressure value of the bristles. The adjustment module comprises a first control unit and a second control unit. The first control unit is configured to determine the first force value according to the difference between the target pressure value and the first pressure value when the first pressure value is less than the target pressure value. The first control unit is further configured to reduce the target holding force output by the motor to the first force value. The target pressure value is related to the force value of the target holding force. The second control unit is configured to determine the second force value according to the difference between the first pressure value and the target pressure value when the first pressure value is greater than the target pressure value. The second control unit is further configured to rise the target holding force output by the motor to the second force value.

In one optional embodiment, the real-time motion data comprises the first current position of the rotating shaft. The adjustment module comprises a first determination unit and a third control unit. The first determination unit is configured to determine the third force value according to the difference between the first current position and the target position when the current position of the brush head determined by the first current position of the rotating shaft is not consistent with the target position. The third control unit is configured to adjust the target holding force output by the motor to the third force value.

In one optional embodiment, the real-time motion data comprises the current position of the brush head in the oral cavity. The adjustment module comprises a first adjustment unit and a second adjustment unit. The first adjustment unit is configured to adjust the target holding force output by the motor to the fourth force value when the current position of the brush head is the tongue coating position. The second adjustment unit is configured to adjust the target holding force output by the motor to the fifth force value when the current position of the brush head is the tooth position. The fourth force value is less than the fifth force value.

In one optional embodiment, the motor comprises the rotating shaft and the first position sensor. The first position sensor is configured to detect the position of the rotating shaft. The electronic limit control device 900 of the electric toothbrush further comprises a second determination module, a third determination module, and a reset module. The second determination module is configured to determining the second current position of the rotating shaft through the first position sensor when the electric toothbrush is in the first state. The third determination module is configured to determine the target reset path according to the second current position of the rotating shaft and the target position when the current position of the brush head determined by the second current position of the rotating shaft is not consistent with the target position. The target reset path is the path with the shortest distance. The reset module is configured to control the brush head to rotate towards the target position until the brush head is rotated to the target position based on the target reset path.

In one optional embodiment, the electric toothbrush further comprises the handle. The target position comprises the predetermined position, or the position where the included angle between the front surface of the brush head and the front surface of the handle is 0° or 45°.

In one optional embodiment, the electronic limit control device 900 of the electric toothbrush further comprises a first control module. The first control module is configured to stop outputting the target holding force output by the motor when the electric toothbrush is switched from the first state to the second state. The second state is different from the first state.

In one optional embodiment, the second state comprises one or more of the electric brushing state, the auxiliary function state, the standby state, and the airplane state.

In one optional embodiment, the electronic limit control device 900 of the electric toothbrush further comprises a fourth determination module, a fifth determination module, and a second control module. The fourth determination module is configured to determine the current brushing mode when the electric toothbrush is switched from the first state to the electric brushing state. The fifth determination module is configured to determine the operating parameters corresponding to the current brushing mode. The second control module is configured to control the motor to rotate to drive the brush head to vibrate according to the operating parameter corresponding to the current brushing mode after the target holding force is stopped outputting. When the electric toothbrush is in the electric brushing state, the driving force output by the motor is greater than the target holding force.

In one optional embodiment, the motor comprises the rotating shaft and the first position sensor. The first position sensor is configured to detect the position of the rotating shaft. The electronic limit control device 900 of the electric toothbrush further comprises a sixth determination module and a third control module. The sixth determination module is configured to determine the third current position of the rotating shaft through the first position sensor after the motor is controlled to rotate to drive the brush head to vibrate according to the operating parameters corresponding to the current brushing mode. The third control module is configured to control the rotating shaft to rotate when the current position of the brush head determined by the third current position is not within the predetermined range, so that the brush head is reset towards the predetermined range. The reset force controlling the brush head to reset to the predetermined range is greater than the target holding force.

In one optional embodiment, the motor comprises the rotating shaft and the first position sensor. The first position sensor is configured to detect the position of the rotating shaft. The electronic limit control device 900 of the electric toothbrush further comprises a detection module and a fourth control module. The detection module is configured to determine the fourth current position of the rotating shaft through the first position sensor when the electric toothbrush is in the electric brushing state. The fourth control module is configured to control the rotating shaft to rotate to enable the brush head being rotated within the predetermined range based on the fourth current position.

In one optional embodiment, the fourth control module is further configured to control the rotating shaft to reciprocate and vibrate within the vibration range with the reference position as the vibration axis based on the fourth current position, and control the rotating shaft to reciprocate and rotate to adjust the reference position. The vibration range is less than the predetermined range. The reciprocating vibration frequency of the rotating shaft is greater than the reciprocating rotation frequency of the rotating shaft.

In one optional embodiment, the electronic limit control device 900 of the electric toothbrush further comprises a third acquisition module, a judgment module, and a fifth control module. The third acquisition module is configured to obtain the states data of the electric toothbrush. The judgment module is configured to determine whether the electric toothbrush meets the wake-up condition according to the state data. The fifth control module is configured to control the electric toothbrush to enter the wake-up state when the electric toothbrush meets the wake-up condition.

In one optional embodiment, the electric toothbrush comprises the detection module. The electronic limit control device 900 of the electric toothbrush further comprises a first airplane module or a second airplane module. The third acquisition module is further configured to obtain the state data of the electric toothbrush through the detection module. The first airplane module is configured to control the detection module not to work when the electric toothbrush is in the airplane state. The second flight module is configured to control the electric toothbrush not to enter the wake-up state even the electric toothbrush meets the wake-up condition when the electric toothbrush is in the airplane state.

In one optional embodiment, the electronic limit control device 900 of the electric toothbrush further comprises a fourth acquisition module and a seventh determination module. The fourth acquisition module is configured to obtain the identification information of the brush head before controlling the motor to continuously output the target holding force. The seventh determination module is configured to determine the force value of the target holding force to be output according to the identification information.

Figure 10:
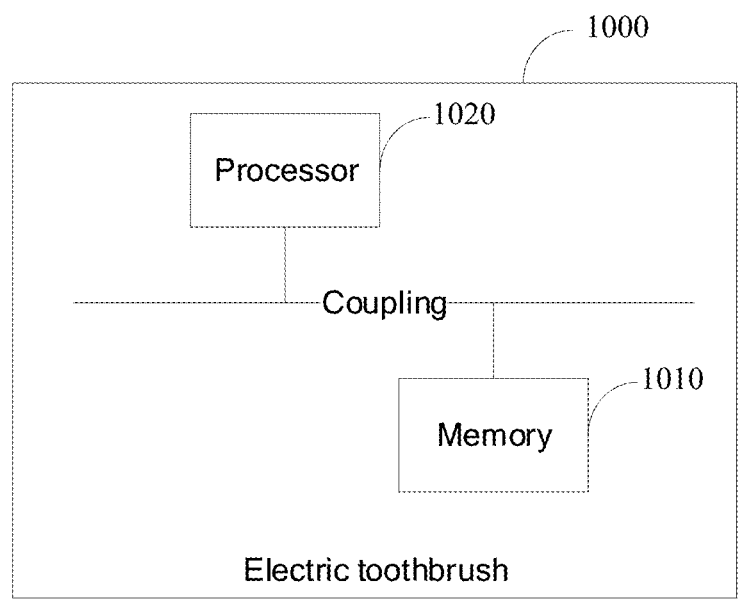
FIG. 10 is a box diagram of the electric toothbrush according to one embodiment of the present disclosure.

FIG. 10 is a box diagram of the electric toothbrush according to one embodiment of the present disclosure. As shown in FIG. 10, the electric toothbrush 1000, comprises a memory 1010 storing executable program codes and a processor 1020 coupled with the memory 1010.

When the executable program codes are executed by the processor 1020, the electronic limit control method of the electric toothbrush according to ant one of the embodiments of the present disclosure is implemented.

The embodiments of the present disclosure disclose a computer-readable storage medium storing a computer program. When the computer program is executed by the processor, the processor implements the electronic limit control method of the electric toothbrush according to ant one of the embodiments of the present disclosure.

It is understood that in the description of the present disclosure, the description of reference terms "one embodiment", "one specific embodiment", etc. mean that particular features, structures, or characteristics described in connection with the embodiments are included in at least one embodiment of the present disclosure. In the specification, schematic representations of the reference terms "in one embodiment", "in one specific embodiment", etc., do not necessarily refer to the same embodiment Furthermore, the specific features, structures, or characteristics described may be combined in any suitable manner in any one or more embodiments or examples. Those skilled in the art should also be aware that the embodiments described in the specification are all optional embodiments, and the actions and modules involved are not necessarily required for the present disclosure.

It should be understood that the order of the steps in the above-mentioned embodiments is not necessarily the order of the execution order, and the execution order of the steps should be determined by function and inherent logic, which should not be regarded as limitations to the implementation processes of the embodiments of the present disclosure.

The units described as separate parts may or may not be physically separate, and parts of the units may or may not be physical units. That is, the parts of the units may be located in one position, or may be distributed on a plurality of network units. Some or all of the units may be selected according to actual needs to achieve the purpose of the solutions of the embodiments.

In addition, functional units in various embodiments of the present disclosure may be integrated into one processing unit, or each of the functional units may separately physically disposed, or two or more functional units may be integrated into one unit. Above integrated unit may be implemented in a form of hardware or a software functional unit.

When the integrated unit is implemented in a form of a software functional unit and sold or sold as an independent product, the integrated unit may be stored in a computer-accessible memory. Based on such understanding, the technical solutions of the present disclosure is essentially or partially embodied in a form of a software product. Alternatively, all or part of the technical solutions that contributes to the related art of the present disclosure is embodied in the form of the software product. The computer software product is stored in the memory, and comprises a plurality of requests for enabling the computer device (e.g., a personal computer, a server, a network device, etc., which may be specifically the processor in the computer device) to perform some or all of the steps of the foregoing methods in the embodiments of the present disclosure.

Those of ordinary skill in the art can understand that all or part of the steps in the methods of the above embodiments are completed by instructing relevant hardware through the computer program, and the computer program may be stored in a computer-readable storage medium. The computer-readable storage medium comprises a read-only memory (ROM), a random access memory (RAM), a programmable read-only memory (PROM), an erasable programmable read only memory (EPROM), a one-time programmable read-only memory (OTPROM), an electronically-erasable programmable read-only memory (EEPROM), a compact disc read-only memory (CD-ROM), or other optical disc storage, a magnetic disk storage, a magnetic tape storage, or any other computer-readable medium configured to carry or store data.

The above embodiments of the present disclosure provide a detailed illustration to the electronic limit control method and the device for electric toothbrush and electric toothbrush. In the present disclosure, specific embodiments are applied to illustrate the principles and implementations of the present disclosure. The above description of the embodiments is only used to better understand methods and core ideas of the present disclosure. Meanwhile, according to the ideas of the present disclosure, changes are made in the specific implementations and the application scope by those skilled in the art. Therefore, the contents of the specification should not be regarded as a limitation of the present disclosure.

What is claimed is:

1. An electronic limit control method of an electric toothbrush, comprising a step:
   controlling a motor of the electric toothbrush to continuously output a target holding force to enable a brush head of the electric toothbrush being kept at a target position, when the electric toothbrush is in a first state;
   wherein the brush head and the motor of the electric toothbrush are connected to each other, a rotating shaft of the motor is able to rotate 360° in a non-powered state, and the rotating shaft of the motor is configured to drive the brush head to rotate within a predetermined range;
   wherein the first state comprises one or more of a wake-up state, a stop state, and a manual state.

2. The electronic limit control method according to claim 1, wherein the rotating shaft of the motor is able to rotate in the non-powered state under a force, and the force is less than the target holding force.

3. The electronic limit control method according to claim 1, wherein before the step of controlling the motor of the electric toothbrush to continuously output the target holding force, the electronic limit control method further comprises steps:

obtaining force reference data of the electric toothbrush; and determining a force value of the target holding force to be output according to the force reference data.

4. The electronic limit control method according to claim 3, wherein the force reference data comprises at least one historical brushing mode and/or at least one historical force gear of the electric toothbrush during operation, in different brushing modes, operating parameters of the motor are different; and in different force gears, the operating parameters of the motor are different;

wherein the step of determining the force value of the target holding force to be output according to the force reference data comprises a step:

determining the force value of the target holding force to be output according to the at least one historical brushing mode and/or the at least one historical force gear;

wherein the force value of the target holding force is positively correlated with the operating parameters, corresponding to the at least one historical brushing mode and/or the at least one historical force gear, of the motor.

5. The electronic limit control method according to claim 3, wherein the force reference data comprises one or more historical force values cached in the electric toothbrush, the one or more historical force values are one or more force values corresponding to the target holding force output by the motor at historical moments before a current moment;

wherein the step of determining the force value of the target holding force to be output according to the force reference data comprises a step:

determining the force value of the target holding force to be output according to the one or more historical force values.

6. The electronic limit control method according to claim 3, wherein the force reference data comprises force setting data, the force setting data is data received from a terminal device, and the step of determining the force value of the target holding force to be output according to the force reference data comprise a step of determining the force value of the target holding force to be output according to the force setting data; or the force reference data comprises a selected brushing mode in the first state and/or a selected force gear in the first state, and the step of determining the force value of the target holding force to be output according to the force reference data comprises a step of determining the force value of the target holding force to be output according to a third predetermined torque corresponding to the selected brushing mode and/or a fourth predetermined torque corresponding to the selected force gear, wherein the force value of the target holding force is positively correlated with the third predetermined torque and/or the force value of the target holding force is positively correlated with the fourth predetermined torque.

7. The electronic limit control method according to claim 1, wherein after the step of controlling the motor of the electric toothbrush to continuously output the target holding force, the electronic limit control method further comprises steps:

obtaining real-time motion data of the electric toothbrush in the manual state; and adjusting the target holding force according to the real-time motion data.

8. The electronic limit control method according to claim 7, wherein the real-time motion data comprises at least one of a first pressure value of bristles, a first current position of the rotating shaft, and a current position of the brush head in an oral cavity;

wherein the first pressure value is detected by a pressure detection sensor of the electric toothbrush, and the pressure detection sensor is configured to detect a pressure applied to the bristles of the brush head;

wherein the first current position of the rotating shaft is detected by a first position sensor, the motor comprises the first position sensor and the rotating shaft, and the first position sensor is configured to detect a position of the rotating shaft;

wherein the current position of the brush head in the oral cavity is detected by a second position sensor.

9. The electronic limit control method according to claim 8, wherein the real-time motion data comprises the first pressure value of the bristles;

wherein the step of adjusting the target holding force according to the real-time motion data comprises:

when the first pressure value is less than a target pressure value, determining a first force value according to a difference between the target pressure value and the first pressure value, and reducing the target holding force output by the motor to the first force value, where the target pressure value being related to a force value of the target holding force; and when the first pressure value is greater than the target pressure value, determining a second force value according to the difference between the first pressure value and the target pressure value, and rising the target holding force output by the motor to the second force value.

10. The electronic limit control method according to claim 8, wherein the real-time motion data comprises the first current position of the rotating shaft;

wherein the step of adjusting the target holding force according to the real-time motion data comprises:

when the current position of the brush head determined by the first current position of the rotating shaft is not consistent with the target position, determining a third force value according to a difference between the first current position and the target position; and adjusting the target holding force output by the motor to the third force value.

11. The electronic limit control method according to claim 1, wherein the motor comprises the rotating shaft and a first position sensor, and the first position sensor is configured to detect a position of the rotating shaft;

wherein the electronic limit control method further comprises:

when the electric toothbrush is in the first state, determining a second current position of the rotating shaft through the first position sensor;

when a current position of the brush head determined by the second current position of the rotating shaft is not consistent with the target position, determining a target reset path according to the second current position of the rotating shaft and the target position, where the target reset path is a path with a shortest distance; and controlling, based on the target reset path, the brush head to rotate towards the target position until the brush head is rotated to the target position.

12. The electronic limit control method according to claim 1, wherein the electric toothbrush further comprises a handle, and the target position comprises a predetermined position, a position where an included angle between a front surface of the brush head and a front surface of the handle is 0°, or a position where an included angle between the front surface of the brush head and the front surface of the handle is 45°.

13. The electronic limit control method according to claim 1, wherein the electronic limit control method further comprises:

stopping outputting the target holding force output by the motor when the electric toothbrush is switched from the first state to the second state;

wherein the second state is different from the first state.

14. The electronic limit control method according to claim 13, wherein the second state comprises one or more of an electric brushing state, an auxiliary function state, a standby state, and an airplane state.

15. The electronic limit control method according to claim 14, wherein the electronic limit control method further comprises steps:

determining a current brushing mode when the electric toothbrush is switched from the first state to the electric brushing state; and determining operating parameters corresponding to the current brushing mode;

wherein after the step of stopping outputting the target holding force output by the motor, the electronic limit control method further comprises a step:

controlling the motor to rotate to drive the brush head to vibrate according to the operating parameters corresponding to the current brushing mode;

wherein when the electric toothbrush is in the electric brushing state, a driving force output by the motor is greater than the target holding force.

16. The electronic limit control method according to claim 15, wherein the motor comprises the rotating shaft and a first position sensor, and the first position sensor is configured to detect a position of the rotating shaft;

wherein after the step of controlling the motor to rotate to drive the brush head to vibrate according to the operating parameters corresponding to the current brushing mode, the electronic limit control method further comprises steps:

determining a third current position of the rotating shaft through the first position sensor; and controlling the rotating shaft to rotate when a current position of the brush head determined by the third current position is not within the predetermined range, and enabling the brush head being reset towards the predetermined range;

wherein a reset force controlling the brush head to reset to the predetermined range is greater than the target holding force.

17. The electronic limit control method according to claim 14, wherein the motor comprises the rotating shaft and a first position sensor, and the first position sensor is configured to detect a position of the rotating shaft;

wherein the electronic limit control method further comprises steps:

determining a fourth current position of the rotating shaft through the first position sensor when the electric toothbrush is in the electric brushing state; and controlling, based on the fourth current position, the rotating shaft to rotate to enable the brush head being rotated within the predetermined range.

18. The electronic limit control method according to claim 17, wherein the step of controlling, based on the fourth current position, the rotating shaft to rotate to enable the brush head being rotated within the predetermined range comprises a step:

controlling, based on the fourth current position, the rotating shaft to reciprocate and vibrate within a vibration range with a reference position as a vibration axis, and controlling the rotating shaft to reciprocate and rotate to adjust the reference position;

wherein the vibration range is less than the predetermined range, and a reciprocating vibration frequency of the rotating shaft is greater than a reciprocating rotation frequency of the rotating shaft.

19. An electric toothbrush, comprising:

a memory; and a processor;

wherein a computer program is stored in the memory, and the computer program is executed by the processor to implements the electronic limit control method according to claim 1.

* * * * *